(12) United States Patent  
Serkh et al.

(10) Patent No.: US 6,500,086 B2  
(45) Date of Patent: Dec. 31, 2002

(54) BLOCK TYPE CVT BELT

(76) Inventors: Alexander Serkh, 316 Falling Brook Dr., Troy, MI (US) 48098-4696; Joseph A. Beaupied, 3619 Woodland, Royal Oak, MI (US) 48073; Scott Ciemniecki, 1098 Northlawn, Birmingham, MI (US) 48009

( * ) Notice: Subject to any disclaimer, the term of this patent is extended or adjusted under 35 U.S.C. 154(b) by 0 days.

(21) Appl. No.: 09/851,041

(22) Filed: May 8, 2001

(65) Prior Publication Data

US 2001/0041636 A1 Nov. 15, 2001

Related U.S. Application Data

(60) Provisional application No. 60/202,930, filed on May 9, 2000.

(51) Int. Cl.$^7$ .................................................. F16G 5/18
(52) U.S. Cl. ........................................ 474/245; 474/242
(58) Field of Search ................................ 474/201, 240, 474/242, 245

(56) References Cited

U.S. PATENT DOCUMENTS

| 4,493,681 A | 1/1985 | Takano ........................ 474/265 |
|---|---|---|
| 4,655,732 A | 4/1987 | Takashima ................... 474/201 |
| 4,734,085 A | 3/1988 | Takashima et al. .......... 474/242 |
| 4,781,658 A | 11/1988 | Takano et al. ................. 474/91 |
| 4,799,919 A | 1/1989 | Kozachevsky et al. ...... 474/205 |
| 4,813,920 A | 3/1989 | Inukai et al. ................ 474/240 |

FOREIGN PATENT DOCUMENTS

| DE | 197 47 173 A 1 | 4/1999 | ............. F16G/1/00 |
|---|---|---|---|
| JP | 61-286638 | * 12/1986 | ............. F16G/5/16 |
| JP | 11-82637 A | 3/1999 | ............. F16G/5/16 |

* cited by examiner

*Primary Examiner*—David A Bucci
*Assistant Examiner*—Timothy McAnulty
(74) *Attorney, Agent, or Firm*—J. A. Thurnau, Esq.; C. H. Castleman, Esq.; S. G. Austin, Esq.

(57) ABSTRACT

A block type CVT belt having at least one endless load carrier. Each load carrier having tensile members. A plurality of blocks are transversely engaged with the load carrier in a lengthwise direction of the load carrier. The center of gravity of each block is asymmetrically located in each block. Each block having a thermoset or thermoplastic over-molding on a metallic reinforcing body. Each block having at least one slot for receiving the load carrier. Each slot having a complex radius between a central pillar and an upper arm and lower arm in order to avoid stress risers. Each load carrier is slightly compressed in each slot to reduce block skew.

26 Claims, 4 Drawing Sheets

BLOCK TYPE CVT BELT

REFERENCE TO RELATED APPLICATIONS

This application claims priority from U.S. application No. 60/202930 filed May 9, 2000.

FIELD OF THE INVENTION

This invention relates to belts used in continuously variable transmissions ("CVT"), and more particularly to CVT belts comprising blocks indexed on endless tensile members.

BACKGROUND OF THE INVENTION

It is well known in the art that a gear type transmission may be used for running a motor vehicle, motorcycle or the like. For the purposes of improving fuel efficiency, a continuously variable transmission, CVT, is preferable. Various types of belts have been developed for use in continuously variable transmissions.

Generally, the CVT Belts have a silhouette similar to that of a conventional V-belt. In particular, they are broad at the top and narrow at the bottom and designed to fit between the sheaves of a pulley defining an angular groove. The pulley on which the belt is trained comprises a moveable sheave and a fixed sheave, both having a truncated cone shape. Generally, one of the sheaves moves while the other remains fixed.

Moving one sheave in relation to the other effectively varies the effective diameter $\phi$ of the pulley within which the belt operates. Consequently, belt speed is a function of the effective diameter of the pulley which is in turn a function of the axial position of the sheaves relative to each other.

Representative of the art is U.S. Pat. No. 4,813,920 to Inukai. The disclosed belt comprises a plurality of blocks which engage at least one endless load carrier in the lengthwise direction of the belt. The blocks are provided with means to hold each in a substantially perpendicular position on the load carrier.

It is also known in the art that in the case of a dry running CVT belt, the outer inclined surface of the block which contacts the surfaces of the pulley sheaves must be comprised of either thermal setting or thermal formed plastic. Using such plastics negates the need for lubrication between the belt and the sheave surface. Blocks may have such plastics only on the inclined surface designed to interface with the pulley sheave or be totally over molded with plastic.

Reference is made to U.S. Pat. No. 4,813,920 to Inukai which discloses an over-molded metal reinforced block type CVT Belt. The over molding is accomplished by chemical preparation of the surface of the reinforcing member. This may involve surface preparation by alkaline soaking process with an acid soaking process. An adhesive layer is then applied to the metal member block consisting of a silane coupling agent, which consists of an amino alkoxy silane. The phenol plastic is then over-molded on the prepared metal member. Of course, the chemical preparation of the metal block requires use of hazardous materials. This creates special handling requirements for the chemicals used to treat the metal blocks as well as for disposal of the chemicals once they have been used. Japanese laid open application JP11-82637-A teaches chemical preparation of a metal reinforced block body prior to application of the plastic over-molding.

Inukai '920 further teaches locating the center of gravity of the blocks within a diameter of a tensile member. It is taught that placement of the center of gravity of the block in proximity to the centerline of the tensile member may reduce oscillation of the blocks during operation. This places requirements on the design of the blocks so the center of gravity is properly located. However, it is questionable whether such placement is advantageous.

Another aspect of the block type CVT belts in that the blocks comprise upper and lower arms connected by a central pillar. The transitions between the pillars and the arms are generally right angles. Such right angle connections create stress risers that decrease the life of the blocks due to failure of the upper arm connection to the central pillar, thereby decreasing the life of the belt.

What is needed is a block type CVT belt having a center of gravity of each block that is asymmetrically located relative to a geometric center of the block. What is needed is a block type CVT belt having a metal reinforced block. What is needed is a block type CVT belt having an over-molded metal reinforced block. What is needed is a block type CVT belt having an over-molded metal reinforced block wherein the surface preparation of the metal reinforcement is accomplished by mechanical means. What is needed is a block type CVT belt having a complex radius between a pillar and an upper and lower support arm. What is needed is a block type CVT Belt having a groove with a complex shape surface on a lower portion. The present invention meets these needs.

SUMMARY OF THE INVENTION

The primary aspect of the invention is to provide a block type CVT Belt having a center of gravity of each block that is asymmetrically located relative to a geometric center of the block.

Another aspect of the invention is to provide a block type CVT Belt having a metal reinforced block.

Another aspect of the invention is to provide a block type CVT Belt having an over-molded metal reinforced block.

Another aspect of the invention is to provide a block type CVT Belt wherein the surface preparation of the metal reinforcement is accomplished by mechanical means.

Another aspect of the invention is to provide a block type CVT Belt having a complex radius between a pillar and an upper and lower support arm.

Another aspect of the invention is to provide a block type CVT Belt having a groove with a complex shape surface on a lower portion.

Other aspects of the invention will be pointed out or made obvious by the following description of the invention and the accompanying drawings.

The block type CVT belt according to the present invention comprises at least one endless load carrier having tensile members. A plurality of blocks are transversely engaged with the load carrier in a lengthwise direction of the belt. The center of gravity of each block is asymmetrically located in each block. Each block has thermoset or thermoplastic over-molding. The over-molding is attached to the metal block by use of an adhesive or primer and adhesive. The preparation of the metal reinforcing member is accomplished by mechanical tumbling means, as opposed to chemical preparation. Each block also comprises at least one slot for receiving the load carrier. Each slot having an upper concave surface and a lower surface having a complex shape. The upper concave surface receives a corresponding convex surface or tooth on an upper surface of the tensile member. Each slot is provided with a complex radius between a central pillar and an upper and lower arm in order to avoid stress risers. The load carriers are slightly compressed in each groove to significantly reduce skew.

DETAILED DESCRIPTION OF THE PREFERRED EMBODIMENT

Figure 1:
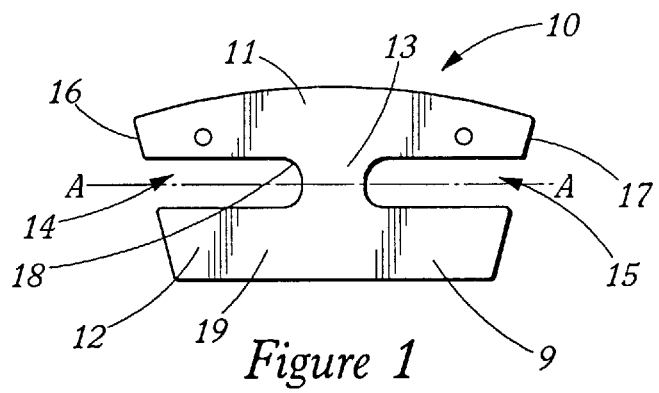
FIG. 1 is a front elevation view of a block.

FIG. 1 is a front elevation view of a block. Block 10 comprises upper body 11 and lower body 12 connected by a central pillar 13. Upper body 11 comprises upper arms 16 and 17 and lower body 12 comprises lower arms 19 and 9. Block 10 also comprises slots 14 and 15. The central pillar 13 is connected to the upper body and lower body with a complex radii in each slot, see FIG. 4. An upper radius 18, which is substantially elliptical, where the upper arm 11 intersects, the central pillar and a lower radius 33, which is substantially a circular section, where the lower arm 12 intersects the central pillar, see FIG. 4. Each of radius 18, 33 describe an arcuate shape. The upper radius is measured from the line A—A. It can be generally described by the equation:

$$x^2/a^2 + y^2/b^2 = 1$$

where a is ½ of the major axis and b is ½ of the minor axis. The major axis lies along the line A—A. Example values include a=3.318 and b=2.327. The equation is offered as a mathematical description of the curve for the preferred embodiment, however, other curves will also serve to reduce the stress risers. The radius from the line A—A to the lower arm is generally in the shape of a quarter circle.

This configuration significantly reduces the stress risers which would otherwise form at the transition between the central pillar and the upper arms and lower arms. Reducing the stress risers causes a commensurate reduction in fracture in this location which can lead to premature failure of the upper or lower arm of the block.

The metallic body may be comprised of any metallic material known in the art. Aluminum alloy is the material used in the preferred embodiment. The surface of block 10 is prepared for over-molding by first subjecting it to a mechanical vibration tumble which creates a texture on the surface of the block favorable to adhesion of the over-molding. Surface preparation can also be by mechanically activating the surface by grit blasting with steel grit (50 grit). Other possible grit blasting media include: glass beads grit, ground glass, glass, Al Oxide, polymer beads, organic materials (such as: walnut shells, corn cob matter), silica carbide, silica/sand and steel. This is followed by a grit blast with yielding a surface roughness Rz 30 to 40. Surface preparation by mechanical means in the manufacturing process avoids problems created by the use of chemical etching and preparation, including storage of the etching chemicals and proper environmentally sound disposal after they are used.

This is then followed by an air blast. The air blast is followed by application of a primer which may include Chemlok® 205, or Thixon™ P15, or Megum™ 3276. The primer is followed by an adhesive suitable for the overmold material being used. The adhesive may include Chemlok® 220, or Thixon™ OSN-2, 2000, or Megum™ 101, or 10576. Alternatively, many of the primers and adhesives given by way of example may be used as one-coat adhesives.

The over-mold material may comprise a phenolic with a coefficient of friction of 0.35±0.15 per ASTMD3702. The overmold material can comprise any of the widely available phenolic molding compounds comprising phenolic resin (resole or novolac), reinforcing fibers or fillers (glass, carbon, cotton, or aramid fibers), friction modifying additives (PTFE, graphite, silicone oil, or molybdenum disulfide), and toughening additives (usually an elastomer such as NBR, XNBR, PEO, PVB, silicone, or epoxy).

The overmold material may further comprise other high performance thermoset plastics such as epoxy or diallylphthalate or vinyl ester.

The overmold material may further comprise certain high performance thermoplastic materials such as polyetherimide, polyimide, polyetherketone, polyetheretherketone, polyphthalamide, liquid crystal polymer, polyethersulfone, polyarylsulfone, polyamide, or polyphenylene sulfide thermoplastics, compounded with glass, aramid or carbon reinforcing fibers and PTFE, graphite, silicone oil, or molybdenum disulfide friction modifiers. A preferred thermoplastic material is Victrex PEEK 450CA30.

Figure 2:
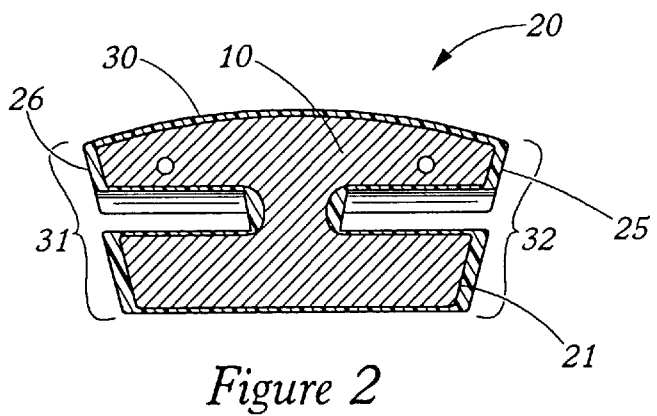
FIG. 2 is a front elevation cross-sectional view of an over-molded block.

FIG. 2 is a front elevation cross-sectional view of an over-molded block. Over-molded block 20 comprises either thermal set or thermal formed plastic 25. Opposing inclined sides 31 and 32 bear on the pulley sheaves. The overmolding provides a controlled friction surface between the block and the sheave surface. The opposing inclined surfaces generally describe an included angle in a range between 20° and 70°. The included angle in the preferred embodiment is 26°.

Figure 3:
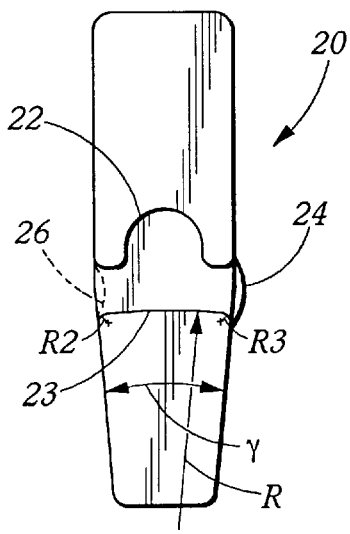
FIG. 3 is a side elevation view of an over-molded block.

FIG. 3 is a side elevation view of an over-molded block. Concave groove 22 is formed in the upper area of slot 15 by the over-molding process. The shape of the concave groove is substantially semicircular. The lower portion of slot 15 comprises a geometrically complex surface 23.

In the preferred embodiment a slight crown is present along the center of the lower surface 23. This significantly reduces the chordal effect caused when the belt passes over a non-circular surface by reducing the apparent pitch of the belt as seen by the belt tensile member. This has the effect of changing the spacing dimension from the width of each block to ½ the width of each block, since the belt as it travels through each pulley initially contacts the edge of each block and then the crown followed by the opposite edge. Chordal effects cause stress risers in the belt tensile members and can reduce the life of a belt caused by premature failure of the tensile members. The lower surface of the slot also comprises a slight arc having radius $R_1$ which provides a proper bearing surface for supporting the tensile members. Also molded into the plastic 25 is indexing protrusion 24 which cooperates with a like indexing recess 26 in an adjacent block. This reduces lateral or side-to-side movement of adjacent blocks during operation. Surface 23 also comprises radii $R_2$ and $R_3$. $R_2$ and $R_3$ each provide a curved surface, as opposed to an edge, that the belt bears upon in operation.

Figure 7:
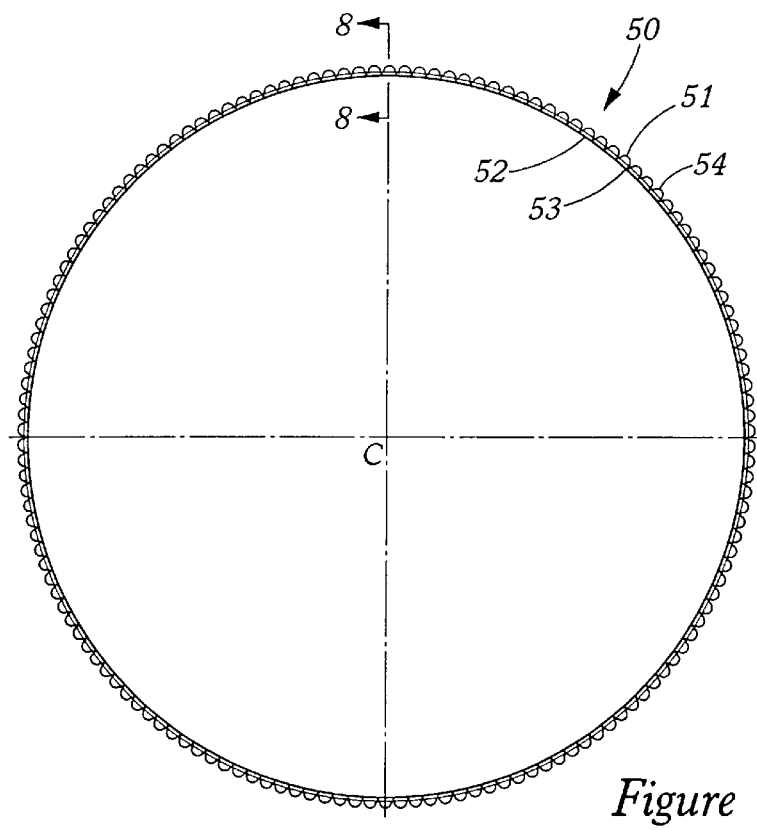
FIG. 7 is a side elevation view of a load carrier.
Figures 11, 12:
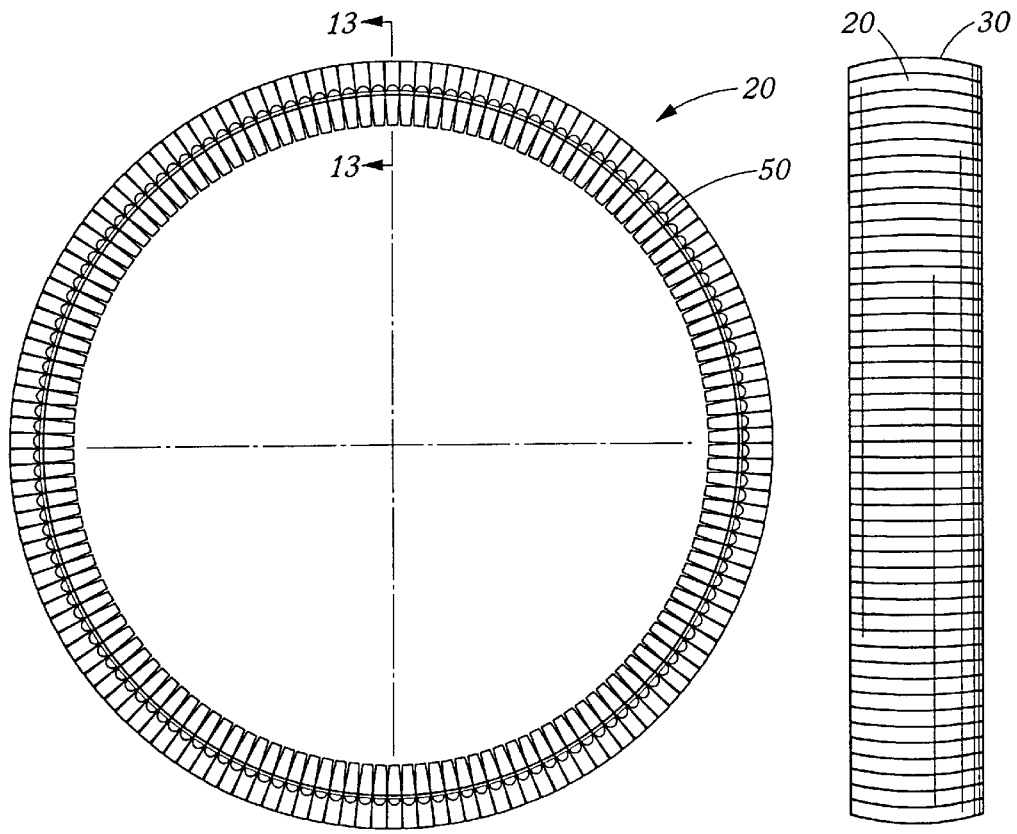
FIG. 11 is a side elevation view of an assembled CVT belt.
FIG. 12 is a front elevation view of a CVT belt.

Concave recess 22 cooperates with a convex tooth 51 on a surface of a load carrier, see FIGS. 7 and 11. The sides of the lower portion of the block describes an angle γ. The angle γ is in the range of 5° to 10°. The angle in the preferred embodiment is 8.8°. The angle γ is chosen based in part upon the minimum radius of the smallest pulley upon which the CVT belt will operate. It allows the lower portion of adjacent blocks to have a clearance between each block as the belt travels around a pulley. This is necessary in order to avoid creating undue stress in the belt tensile member 52.

Figure 4:
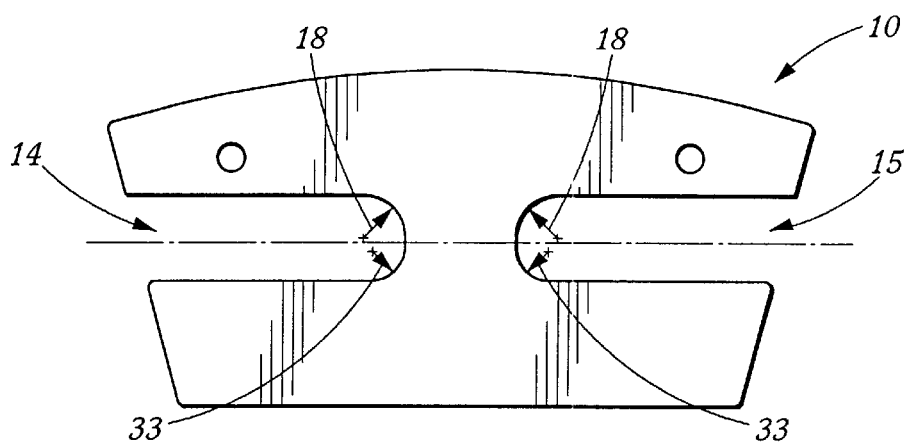
FIG. 4 is a front elevation view of showing a slot detail.

FIG. 4 is a front elevation view of showing a slot detail. Upper radius 18 and lower radius 33 is shown formed in slot 14, 15.

Figure 5:
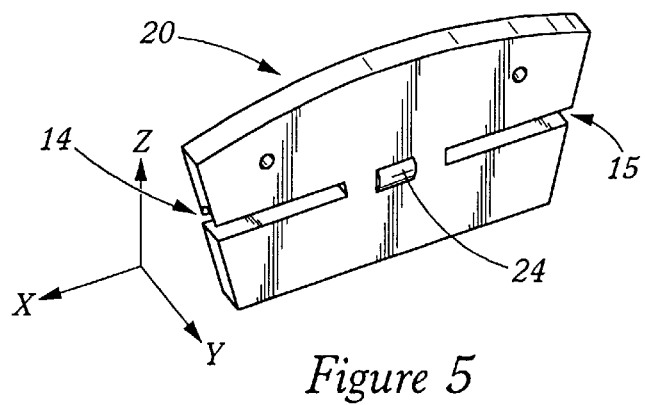
FIG. 5 is a isometric perspective view of the over molded block.

FIG. 5 is a isometric perspective view of the over-molded block 20.

Figure 6:
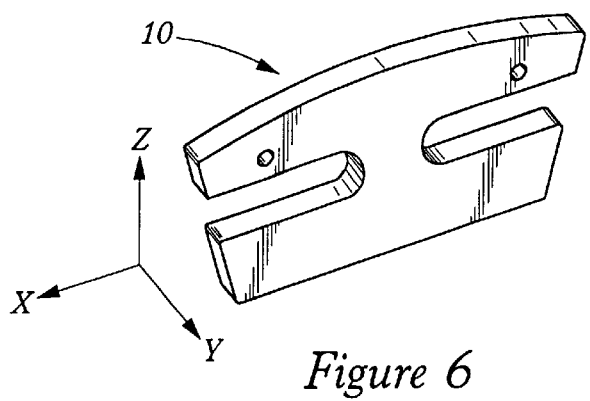
FIG. 6 is a isometric perspective view of the metal reinforcing body.

FIG. 6 is a isometric perspective view of the metal reinforcing body 10.

FIG. 7 is a side elevation view of a load carrier. Load carrier 50 comprises tensile band 52 and teeth 51. In the preferred embodiment, the tensile members are positioned at the neutral bending axis of the belt assembly to minimize stress in the cord. Each tensile member may comprise twisted or braided cords, a woven fabric or sheet like substance comprising organic fibers such as polyamide, polyester, polyaramide, or inorganic fiber such as PBO, steel fiber, glass fiber, or carbon fiber. Fabric jacket 54 is applied to the outercord of the load carrier. Fabric jacket 53 is also applied to the inner surface of the load carrier. Each tensile member may comprise twisted or braided cords of organic fibers such as polyaramids, polyesters, polyamide, or PBO, or inorganic fibers such as steel, glass, or carbon. Preferably, a high strength, high modulus cord material such as polyaramid, PBO, carbon or glass is used.

The fabric jacket may comprise woven, non-woven or knit fabrics of polyester, polyamide, polyaramid, cotton, or acrylic fibers or blends thereof, and adhesive treatments appropriate for bonding the fabric to the extensible layer and to the cord. The jacket is preferably a woven or knit stretch fabric for ease in filling the mold and forming the tooth contour.

The designation of the outercord and inner surface are with reference to a center of curvature C of the belt. The belt body and teeth 51 may comprise a rubber material comprising an elastomer such as EPDM, HNBR, PU, ACSM, CR, SBR, or NBR or blends thereof, and various fillers, antioxidants, curatives and/or short reinforcing fibers as is known in the art. Preferably, a heat resistant elastomer such as EPDM or HNBR is used. The belt body and teeth 51 may comprise an elastomer such as urethane, HNBR, ACSM, EPDM, CR, SBR, NBR, compounded with fillers, reinforcements, antioxidants, and curatives.

Figure 8:
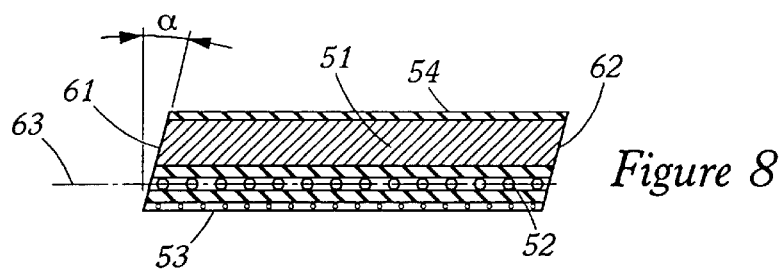
FIG. 8 is a front section view of a tooth profile at line A—A in FIG. 7.

FIG. 8 is a front section view of a tooth profile at line 8—8 in FIG. 7. Tooth 51 has inclined sides 61 and 62. Belt side 61 and side 62, which are parallel to each other, and are molded, cut or ground on a bias angle α as compared to an axis normal to a centerline 63 of load carrier 50. The bias angle α is in the range of 10° to 15°. The angle α in the preferred embodiment is 13°. This angle is also the same as ½ of the included angle of the opposing inclined surfaces, β, so that the side 62 is parallel to opposing inclined surface 32, see FIG. 2. Angle α allows a proper fit between the load carrier 50 and the block 20 at the central pillar 13.

Figure 9:
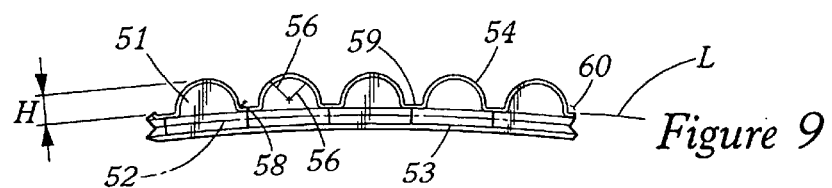
FIG. 9 is a side elevation view detail of belt teeth.

FIG. 9 is a side elevation view detail of belt teeth. Teeth 51 are alternately spaced between lands 59. Teeth 51 are located along the outercord of the load carrier. Teeth 51 generally describe a semicircular profile which cooperate with the concave grove 22. For example, the tooth profile may comprise the profile disclosed in U.S. Pat. No. 4,515,577, or other profile known in the art. Jacket 54 overlays the teeth.

In the preferred embodiment, the tooth profile comprises a height H as measured form an outer surface of jacket 54. Each tooth has an arcuate convex substantially circular shape having a radius 56 R. Each tooth outer surface joins to the adjacent land 59 by a transition section 60. Transition section 60 has a radius 58 of approximately 0.5R to R. The center of curvature C for the tooth radius 56 is located along a line extending across each tooth approximately ⅓ R above line L.

Figure 10:
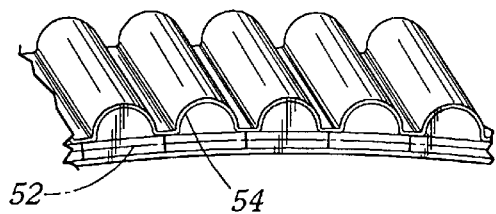
FIG. 10 is an isometric view of belt teeth.

FIG. 10 is an isometric view of belt teeth.

FIG. 11 is a side elevation view of an assembled block type CVT belt. Blocks 20 are arranged adjacent to each other about the entire circumference of the load carrier 50. The preferred embodiment comprises two endless load carriers 50, 80. Each load carrier 50, 80 is contained in a slot 15, 14 respectively. There is a slight interference fit between the load carrier and each groove or slot. The interference is in the range of 5% to 15% of the thickness of the load carrier. This slight compression of the load carrier significantly reduces the tendency of the blocks to skew during operation. Skew is the term used to describe misalignment between the x-axis of the block and the y axis of the load carrier.

For example, for a assembled belt having an inner radius of 219.83 mm as measured from the center of curvature to the bottom of the blocks, a total of 148 blocks are used for load carriers with a block pitch of 5 mm. As a result each block is 4.93 mm wide at the central pillar. The width of each block can be varied by changing the thickness of the over-molding. The tensile member is compressed approximately 10% by width when the clips are installed. This assures good load transmission from the clip to the belt and helps to prevent clip skew during operation. Further, the fit between each upper slot and each upper surface tooth comprises a slight gap which allows relative movement of the tooth and clip as well as facilitating cooling.

FIG. 12 is a front elevation view of a CVT belt. Blocks 20 are transversely arranged on each load carrier 50. Upper surface 30 of each block describes an arcuate shape having a center of curvature located at the central axis of the belt.

Figure 13:
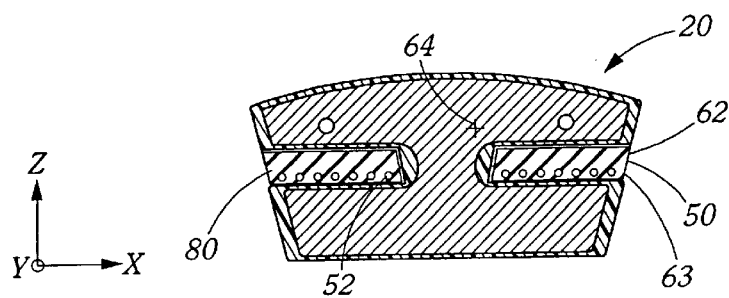
FIG. 13 is a front elevation view of a block taken at line A—A in FIG. 11.

FIG. 13 is a front section view of a block taken at line 13—13 in FIG. 11. Block 20 has a geometric center located in the central pillar 13 at the origin of the z-axis, x-axis and y axis. Block 20 has a center of gravity 64 asymmetrically located with reference to the geometric center at a position in an upper quadrant of the block. By way of example and not of limitation and based upon the described coordinate system, in a block having a width of 38.0 mm as measured in the x-axis and a height of 17.9 mm as measured in the z-axis and a width of 4.9 mm as measured in the y-axis, the center of gravity ("CG") is asymmetrically located in each block in a quadrant with dimensions x=0.0076 mm, y=0.0027 mm, z=1.1196 mm. This places the CG at a point that is not coincidental with, A) the geometric center of the block, or B) the centerline of the tensile members, which is contrary to all prior teaching. A plane described by side 62 of the belt lies slightly recessed from opposing inclined surface 32. The distance is 1–2 mm in the preferred embodiment. This prevents the side of load carrier 52 from contacting the pulley sheave surface. This in turn reduces heat generated during operation. Increased heat will significantly shorten the operational life span of a load carrier.

Although a single form of the invention has been described herein, it will be obvious to those skilled in the art that variations may be made in the construction and relation of parts, without departing from the spirit and scope of the invention described herein.

We claim:

1. A belt comprising:
   at least one endless load carrier having tensile members and further comprising a plurality of teeth on an outer surface of the load carrier and arranged transverse to a length of said load carrier;
   a plurality of blocks, each block having opposing inclined surfaces and each having a slot oriented from each inclined surface toward a central pillar;
   each block having a center of gravity disposed from a geometric center;
   each slot comprises a complex arcuate shape between a first point on a central pillar and an upper arm and a complex arcuate shape between a first point on a central pillar and a lower arm;
   the complex arcuate shape between a first point on a central pillar and an upper arm is substantially elliptical; and
   each upper arm having an arcuate surface cooperatively engaging an endless load carrier tooth.

2. The belt as in claim 1, wherein each of said blocks further comprises:
   a metallic reinforcing body; and
   a non-metallic material over-molded on at least the opposing inclined surfaces of said metallic reinforcing body.

3. The belt as in claim 1, wherein a surface of each metallic reinforcing body is prepared by mechanical tumbling.

4. The belt as in claim 1, wherein each of said slots further comprises a lower portion describing a surface having a crown.

5. The belt as in claim 1, wherein each endless load carrier is compressed in each slot.

6. The belt as in claim 5, wherein each endless member is compressed in each slot by an amount in the range of approximately 5% to 15% of an uncompressed thickness of the endless member.

7. The belt as in claim 1 wherein the center of gravity is disposed in a block upper quadrant.

8. The belt as in claim 1, wherein the center of gravity is non-coincidental with a block centerline and is not coincidental with a tensile member centerline.

9. The belt as in claim 1, wherein the center of gravity is not equidistant between block sides on a x-axis.

10. The belt as in claim 1, wherein the center of gravity is not equidistant between block sides on an y-axis.

11. The belt as in claim 1, wherein the center of gravity is not equidistant between block sides in a z-axis.

12. The belt as in claim 1, wherein the complex arcuate shape between a first point on a central pillar and a lower arm is substantially circular.

13. A block type CVT belt comprising:
   at least one endless load carrier having tensile members and further comprising a plurality of teeth on an outer surface of the load carrier and arranged transverse to a length of said load carrier;
   a plurality of blocks, each block having opposing inclined surfaces and each having a groove oriented from each inclined surface toward a central pillar and each block having a center of gravity located asymmetrically to a geometric center;
   said blocks engaging said load carrier, each block engaging a tooth with said groove;
   a metallic reinforcing body;
   a non-metallic material over-molded on said metallic reinforcing body; and
   each groove describing a substantially elliptical shape between a first point on a central pillar and an upper arm, and a substantially circular shape between a first point on a central pillar and a lower arm.

14. The block type CVT belt as in claim 13, wherein each of said grooves further comprises:
   a lower portion describing a complex shape having a crown; and
   an upper portion describing an arc.

15. The block type CVT belt as in claim 14, wherein each endless load carrier is subjected to a compression in each groove.

16. The block type CVT belt as in claim 15, wherein the compression comprises:
   reducing the width of the endless member in each groove by an amount in the range of 5% to 15% of a thickness of the endless member.

17. A power transmission belt comprising:
   a first endless member;
   a second endless member;
   each of said first and second endless members comprising a tensile member embedded therein, said tensile member being twisted cords and each of the endless members having an upper surface comprising a plurality of cogs arranged parallel to each other and transverse to a length of each endless member, and each of said endless members comprising a flat lower surface;
   a plurality of blocks, each comprising a metal body having a plastic over-molding and each having opposing inclined surfaces describing an angle that cooperates with a pulley angle, and having a slot extending from each opposing inclined surface toward a central part of each block for receiving an endless member, and each slot having an upper concave surface and an opposing substantially flat surface, each concave surface receiving a cog;
   the center of gravity of each block is located asymmetrically of a geometric center of said block, said center of gravity located in a z-range extending toward an upper portion a distance greater than a tensile member radius as measured from a geometric center of the block, the center of gravity being located in an x-range offset to one side of a geometric center of a block and biased in a y-range offset from a geometric center;
   each slot describing a substantially elliptical shape between a first point on a central part and an upper arm; and
   a plurality of said blocks transversely engaging the first endless member and the second endless member.

18. A belt comprising:
   at least one endless load carrier having tensile members and further comprising a plurality of teeth on an outer surface of the load carrier and arranged transverse to a length of said load carrier;

a plurality of blocks, each block having opposing inclined surfaces and each having a groove oriented from each inclined surface toward a central pillar and each block having a center of gravity located asymmetrically from a geometric center;

each groove comprises a complex radius describing a substantially elliptical quarter radius between a first point on a central pillar and an upper arm and a substantially circular quarter radius between a first point on a central pillar and a lower arm and each upper arm having an arcuate surface for cooperatively engaging a tooth; and each of said blocks engaging said load carrier with said groove.

19. The belt as in claim 18, wherein each of said blocks further comprises:

a metallic reinforcing body; and a non-metallic material over-molded on at least the opposing inclined surfaces of said metallic reinforcing body.

20. The belt as in claim 19, wherein a surface of each metallic reinforcing body is prepared by mechanical tumbling.

21. The belt as in claim 20, wherein each of said grooves further comprises a lower portion describing a complex shape having a crown.

22. The belt as in claim 21, wherein each endless load carrier is subjected to compression in each groove.

23. The belt as in claim 22, wherein the compression comprises reducing the width of the endless member in each groove by an amount in the range of 5% to 15% of a thickness of the endless member.

24. The belt as in claim 18 wherein the center of gravity is located in a block upper quadrant.

25. The belt as in claim 24, wherein the center of gravity is non-coincidental with a block centerline and is not coincidental with a tensile member centerline.

26. The belt as in claim 25, wherein the center of gravity is not equidistant between block sides on a y-axis.

* * * * *